US00RE36992E

United States Patent [19]

Citta et al.

[11] E Patent Number: Re. 36,992

[45] Reissued Date of Patent: Dec. 19, 2000

[54] VSB HDTV TRANSMISSION SYSTEM WITH REDUCED NTSC CO-CHANNEL INTERFERENCE

[75] Inventors: Richard W. Citta, Oak Park; Dennis M. Mutzabaugh; Gary J. Sgrignoli, both of Mt. Prospect, all of Ill.

[73] Assignee: Zenith Electronics Corporation, Glenview, Ill.

[21] Appl. No.: 08/194,301

[22] Filed: Feb. 9, 1994

Related U.S. Patent Documents

Reissue of:

[64] Patent No.: 5,087,975
Issued: Feb. 11, 1992
Appl. No.: 07/611,236
Filed: Nov. 9, 1990

[51] Int. Cl.[7] ..... H04N 5/38

[52] U.S. Cl. ..... 348/21; 348/608

[58] Field of Search ..... 348/21, 608, 611, 348/614, 613, 723, 724, 571, 572; H04N 5/38

[56] References Cited

U.S. PATENT DOCUMENTS

| | | | |
|---|---|---|---|
| 3,706,843 | 12/1972 | Laub | 358/138 |
| 3,946,432 | 3/1976 | Goldberg et al. | 358/13 |
| 4,115,811 | 9/1978 | Goff | 358/138 |
| 4,216,496 | 8/1980 | Lothian et al. | 358/188 |
| 4,244,004 | 1/1981 | Yamada | 348/572 |
| 4,343,019 | 8/1982 | Lagoni | 358/31 |
| 4,558,352 | 12/1985 | Sauer | 358/31 |
| 4,602,278 | 7/1986 | Pritchard et al. | 358/31 |
| 4,951,146 | 8/1990 | Citta | 358/186 |
| 5,121,203 | 6/1992 | Citta | 358/141 |

FOREIGN PATENT DOCUMENTS 59-15387 1/1984 Japan .

OTHER PUBLICATIONS

Quadrature Vestigial Sideband (QVSB) Data Transmission; Brian G. Henderson, Joseph A. Webb, Members, IEEE, IEEE Transactins on Communications, vol.,Com–33. No. 12, Dec. 1985.

Envelope Detection of Binary VSB Data Signals, L.J. Millott, IEEE Transactions on Communications, vol. Com–33, No. 7, Jul. 1985.

Stremler, Introduction to Communications Systems, 2nd Ed., 1982 vii–x, 122–126, 504–506, Title Page (Both Sides).

*Primary Examiner*—Victor R. Kostak

[57] ABSTRACT

A television signal transmission signal comprises a suppressed carrier, VSB signal having respective Nyquist slopes at the lower and upper edges of a 6 MHz television channel, the center frequency of the Nyquist slope at the lower edge of the channel being substantially coincident with the frequency of the suppressed carrier, and a pilot signal in quadrature relation with the suppressed carrier. The suppressed carrier is modulated by an N-level digitally encoded signal having a sample rate fs substantially equal to three times the NTSC color subcarrier frequency, with the frequency of the color subcarrier being less than the co-channel NTSC picture carrier by an amount equal to about fs/12. The received signal is demodulated by a synchronous detector in response to the received pilot signal and interfering NTSC beat components are attenuated by a linear filter having notches at fs/12, 5fs/12 and fs/2. The output of the filter comprises an M-level signal, where M is greater than N, which is converted to a N-level output signal representing the televised image.

90 Claims, 8 Drawing Sheets

VSB HDTV TRANSMISSION SYSTEM WITH REDUCED NTSC CO-CHANNEL INTERFERENCE

Matter enclosed in heavy brackets [ ] appears in the original patent but forms no part of this reissue specification; matter printed in italics indicates the additions made by reissue.

CROSS REFERENCE TO RELATED APPLICATIONS

This application is related to co-pending application Ser. No. 600,469, filed Oct. 18, 1990, entitled "Co-Channel Interference Filter for Digital High Definition Television Receiver", to application Ser. No. 601,169, filed Oct. 19, 1990, entitled "Co-Channel Interference Reduction System for Digital High Definition Television", and to application Ser. No. 600,458, filed Oct. 19, 1990, entitled "HDTV Transmission System for Digital High Definition Television", all of which applications are assigned to the assignee of the present application and which are incorporated herein by reference.

BACKGROUND OF THE INVENTION

The present invention generally relates to television signal transmission systems and particularly concerns a vestigial sideband (VSB) digital television signal transmission system having reduced susceptibility to NTSC co-channel interference.

Simulcast broadcasting is a technique which has been proposed for providing high definition television services without obsoleting the large installed base of NTSC receivers. Simply put, simulcast broadcasting contemplates simultaneous transmission of identical program material encoded in two different formats over respective 6 MHz television channels. Thus, for example, a particular program may be encoded in NTSC format for transmission over a first 6 MHz television channel and in an HDTV format for transmission over a second different 6 MHz television channel. Viewers equipped only with NTSC receivers would therefore be able to receive and reproduce the program encoded in NTSC format by tuning the first channel, while viewers equipped with HDTV receivers would be able to receive and reproduce the same program encoded in HDTV format by tuning the second channel.

The foregoing, of course, contemplates the allocation of additional 6 MHz television channels for the transmission of HDTV encoded signals within a given NTSC service area. While such additional channels are generally available for this purpose, at least some of the same channels are also quite likely to be allocated for NTSC transmissions in nearby television service areas. This raises the problem of co-channel interference where HDTV and NTSC transmission over the same channel in nearby television service areas interfere with one another. NTSC co-channel interference into a received HDTV signal is of particular concern due to the relatively large picture and color carriers characterizing an NTSC transmission. HDTV systems employing an all digital transmission standard further add to this concern, since excessive NTSC co-channel interference from a nearby transmitter could abruptly render an HDTV receiver incapable of reproducing any image rather than gradually degrading the performance of the receiver.

A number of proposed HDTV systems contemplate a transmission standard comprising a pair of amplitude modulated, double sideband components having respective suppressed quadrature carriers located in the middle of a 6 MHz television channel. While this transmission standard has certain desirable attributes, it also has a number of disadvantages. First and foremost, cross talk between the two quadrature channels can significantly degrade receiver performance unless special care is taken to avoid or compensate for the causes of such cross talk. Other forms of transmission standards, e.g. VSB transmission, are not subject to the cross talk disadvantage and are equally desirable in other respects, especially where the transmission is effected in a digital format. The problem of NTSC co-channel interference, however, remains an important consideration before such a transmission standard can be successfully employed.

OBJECTS OF THE INVENTION

It is therefore a basic object of the present invention to provide an improved simulcast television signal transmission system.

It is a further object of the invention to reduce the effects of co-channel interference in a VSB simulcast television signal transmission system.

It is still a further object of the invention to reduce the effects of co-channel interference caused by the picture and color carriers of an NTSC signal in an HDTV receiver.

It is yet another object of the invention to reduce the effects of co-channel interference caused by an NTSC signal in an HDTV receiver operable for reproducing an image in response to an all digital HDTV transmission standard.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

Figure 1:
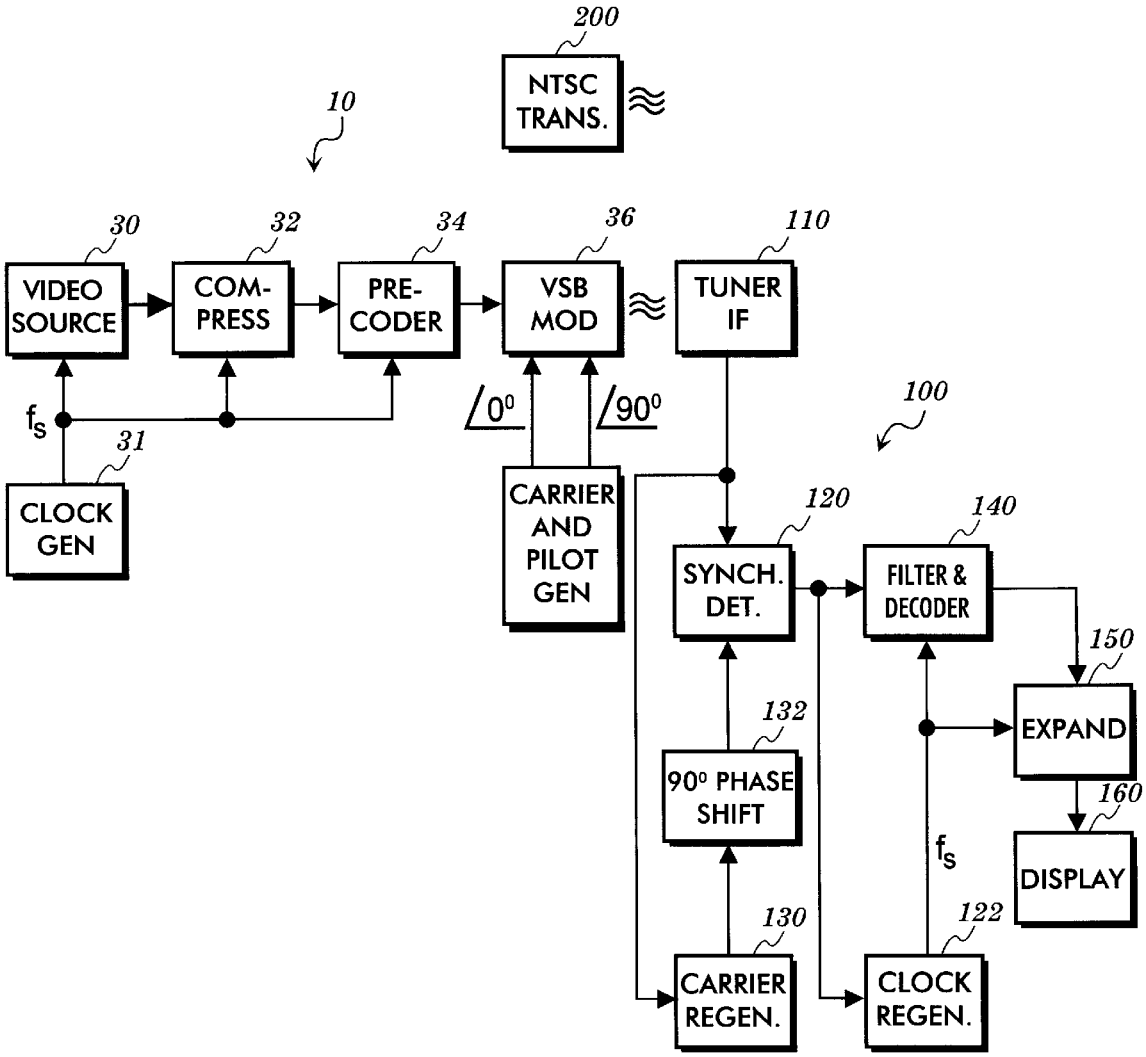
FIG. 1 is a block diagram of a television signal transmission signal constructed in accordance with the invention.

The problem addressed by the present invention is generally illustrated in the block diagram of FIG. 1. An HDTV transmitter, designated generally by reference numeral 10, broadcasts an HDTV encoded signal over a selected 6 MHz television channel for reception and reproduction by a corresponding HDTV receiver 100 tuned to the selected channel. At the same time, an NTSC transmitter 200 broadcasts an NTSC encoded signal over the same channel in a nearby television service area. Depending on various factors including its physical location, the HDTV receiver 100 may thus receiver an interfering component of considerable strength from the NTSC transmitter 200 in addition to the desired signal from HDTV transmitter 10. Since the undesired interfering signal is transmitted on the same channel as the desired HDTV signal, it is commonly referred to as co-channel interference. The co-channel interfering signal in the HDTV receiver especially poses a problem in the case where an all digital HDTV transmission standard is employed. In particular, if the co-channel interfering signal is of sufficient strength to "swamp out" the digital HDTV signal in the receiver, the ability of the receiver to reproduce an image of any quality may be completely compromised. Moreover, this impairment of the HDTV receiver may arise quite abruptly with variations in the strength of the interfering NTSC co-channel signal. This is in contrast to analog HDTV transmission systems in which variations in the strength of the interfering NTSC co-channel signal cause gradual changes in the signal-to-noise performance of the receiver.

As is well known in the art, the spectrum of the interfering NTSC co-channel signal occupies a 6 MHz television channel and includes a luma component, a chroma component and an audio component. The luma component has a bandwidth of about 4 MHz and is modulated on a picture carrier spaced 1.25 MHz from one end of the channel. The chroma component, which has a bandwidth of about 1 MHz, is modulated on a subcarrier spaced about 3.58 MHz from the picture carrier. The audio component is modulated on a carrier spaced 0.25 MHz from the other end of the channel (i.e. 4.5 MHz from the picture carrier.). The major contributors to co-channel interference are the relatively large NTSC picture carrier and chroma subcarrier, and to a lesser extent the audio carrier.

Figure 2:
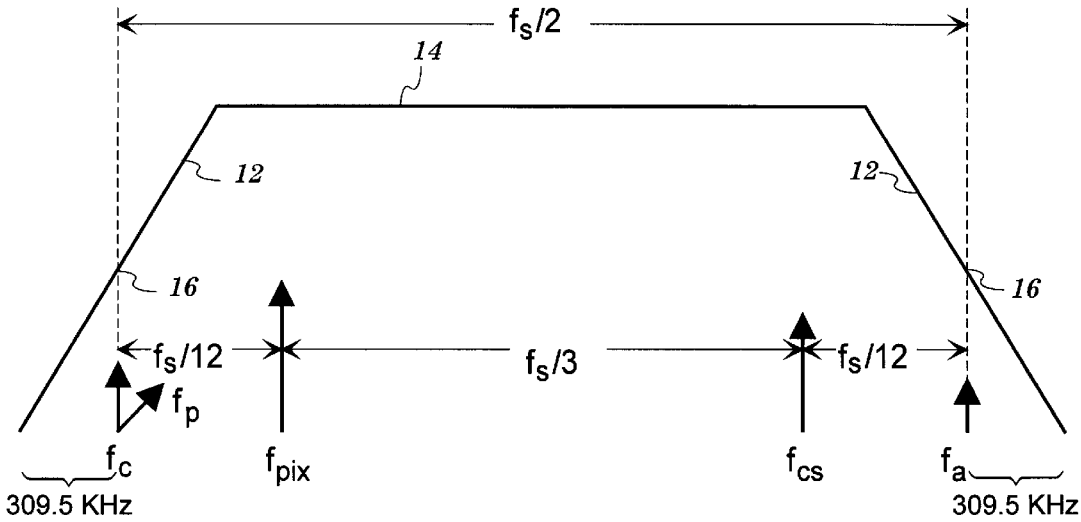
FIG. 2 is a graph illustrating the spectrum of a 6 MHz HDTV television channel in accordance with the invention.

FIG. 2 illustrates the spectrum of an HDTV transmission channel according to the present invention. The channel occupies 6 MHz corresponding to an NTSC transmission channel through which a VSB signal is transmitted as illustrated. More particularly, a respective Nyquist slope 12 is provided at each edge of the channel with a substantially flat response portion 14 extending therebetween. The interval between the center frequencies 16 of the respective Nyquist slopes 12 define the Nyquist bandwidth of the channel which can be expressed as fs/2, where fs is the sampling rate of the data to be transmitted through the channel. A suppressed picture carrier fc for the channel is selected to have a frequency corresponding to the center frequency 16 of the Nyquist slope 12 at the lower edge of the channel, which therefore comprises a vestigial sideband portion including the frequencies along Nyquist slope 12 at the lower edge of the channel and a single sideband portion including the remaining frequencies up to the upper edge of the channel. It will be appreciated that modulation of the picture carrier fc results in quadrature components at all frequencies except the frequency of the picture carrier itself. This allows a quadrature pilot fp to be inserted in the channel at the frequency of the picture carrier fc to facilitate its regeneration at the receiver without interference from quadrature components resulting from modulation of the picture carrier.

In accordance with the invention, the Nyquist bandwidth fs/2 of the channel can be thought of as being divided into six (6) equal parts. The interval between the co-channel NTSC picture carrier fpix and color subcarrier fcs is defined as comprising four (4) of the six (6) parts, such that fcs=(4/6) fs/2. Therefore, fcs=fs/3 or, stated otherwise, the sampling rate fs=3 fcs, which equals approximately 10.762 MHz. Furthermore, in accordance with the foregoing the interval between the picture carrier fc and the co-channel NTSC picture carrier fpix comprises fs/12 and the interval between the center frequency 16 of the Nyquist slope 12 at the upper edge of the channel and the co-channel NTSC color subcarrier fcs likewise equals fs/12. The intervals from the center frequencies 16 of the Nyquist slopes 12 to the respective channel edges thus comprise approximately 309.5 KHz.

Figure 3:
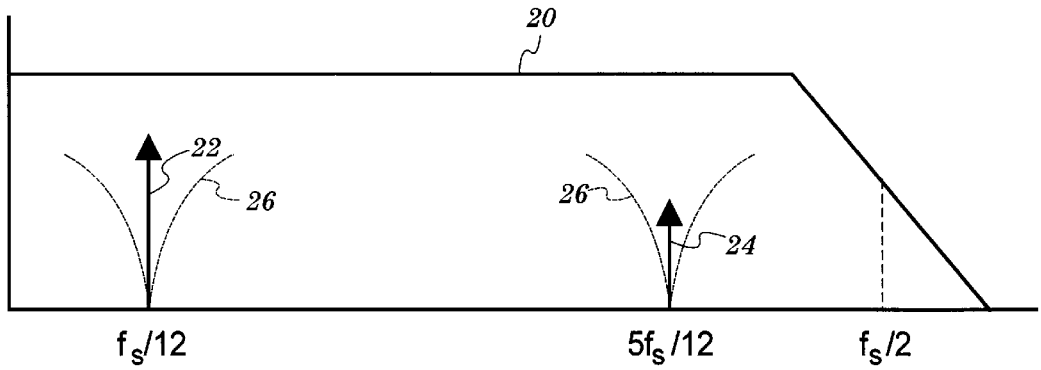
FIG. 3 is a graph illustrating the response of an HDTV receiver of the invention to co-channel HDTV and NTSC transmissions.

FIG. 3 depicts the baseband response of HDTV receiver 100. As illustrated in this figure, the nominal response of the HDTV receiver is substantially flat across the channel as represented by curve 20, and is characterized by a Nyquist bandwidth of fs/2. The baseband HDTV signal is preferably produced by a synchronous detector in response to a regenerated carrier having a frequency and phase corresponding to the suppressed HDTV carrier fc. In the presence of an NTSC co-channel signal, detection in response to the regenerated carrier will also provide a pair of interfering beat signals at frequencies corresponding to fs/12 and 5fs/12. In particular, a first interfering beat signal will be produced at a frequency corresponding to fs/12 in response to the regenerated carrier and the NTSC picture carrier and a second beat signal will be produced at a frequency corresponding to 5fs/12 in response to the regenerated carrier and the NTSC chroma subcarrier. The interfering beat signals are represented in FIG. 3 by reference numerals 22 and 24 respectively. As will be explained in further detail hereinafter, receiver 100 includes a filter having a response including respective notches at these two beat frequencies, as represented by reference numeral 26, for reducing the effect of the co-channel interference beats.

It may be desirable to lock the data sampling rate fs to a multiple of the horizontal scanning rate fh of the NTSC transmission to, for example, facilitate conversion between NTSC and HDTV encoded signals. Relating the nominal video sampling rate fs to the NTSC horizontal scanning rate fh provides:

$$fs=3fcs=3(455fh/2)=682.5fh$$

Therefore, in order to establish an integral relation between, fs and fh, fs can be selected to equal a multiple of fh between, for example, 680 and 684. In a presently preferred embodiment of the invention, the sampling rate fs has been selected to equal 684 fh. In any case, the notches of response 26 will slightly deviate from their nominal frequencies, but this can be at least partially offset by slightly shifting the HDTV RF channel so that the NTSC interference beats more closely coincide with the deviated notches. For example, this may be achieved in the case where the video sampling rate fs is selected to be 684fh by shifting the RF channel by about 38 KHz toward its lower edge. It may also be desirable to further slightly shift the RF channel for setting the picture carrier frequency fc equal to an integer multiple of one-half the NTSC horizontal line rate to, for example, facilitate the use of a line comb to recover certain components of the HDTV signal, such as a sync component.

In accordance with the foregoing, and referring back to FIG. 1, the HDTV transmitter 10 comprises a video source 30 receiving a clock signal fs from a clock generator 31 to provide a digital video signal having a bandwidth of up to about 37 MHz at a data sampling rate of fs, where fs is nominally equal to 3fsc. As explained previously, the sampling rate may have an integral relation to the NTSC horizontal rate fh, for example, fs=684 fh. Although not limited thereto, the video signal provided by source 30 preferably comprises 787.5 progressively scanned lines per frame, 720 of which represent active video, having a vertical repetition rate corresponding to the NTSC field rate and a horizontal repetition rate corresponding to three times the NTSC horizontal scanning rate. The video signal developed by source 30 is applied to a video compressor 32 which compresses the 37 MHz video signal sufficiently to allow for its transmission through a standard 6 MHz television channel. The compressed video signal is then coupled to a precoder 34, which will be described in further detail hereinafter, and therefrom to a VSB modulator 36 for transmission. Both compressor 32 and precoder 34 are operated in response to clock signal fs from clock generator 31. Modulator 36 is supplied with a carrier signal having a nominal frequency of fs/12 less than the corresponding NTSC picture carrier frequency. Also, a quadrature component of the carrier signal is applied to modulator 36 to facilitate generation of the quadrature pilot signal fp. The frequencies of the clock and carrier signals can, of course, be slightly adjusted from the nominal values as previously described. The video signal is transmitted as a sequence of N-level data samples, with the transmission preferably being effected by modulator 36 in the form of a suppressed carrier, VSB signal as illustrated in FIG. 2, with the quadrature pilot signal fp being provided to facilitate regeneration of the carrier in receiver 100.

Receiver 100 includes a tuner and IF stage 110 tuned to the 6 MHz television channel over which the HDTV signal is transmitted. The tuned HDTV signal, together with a co-channel NTSC signal broadcast on the same channel by transmitter 200 in a nearby television service area, are converted to an IF frequency in stage 110 and coupled to the input of a synchronous detector 120. The output of stage 110 is also coupled to a carrier regenerator 130 which is responsive to the received pilot signal for regenerating a signal having a frequency equal to but in quadrature with the HDTV suppressed carrier fc. Carrier regenerator 130 preferably comprises a narrow band frequency and phase locked loop circuit. The regenerated carrier is applied to a 90° phase shift circuit 132 and therefrom to a second input of synchronous detector 120. The output of synchronous detector 120, which is represented by the response curves of FIG. 3, thus includes the desired HDTV component, represented by curve 20, and the undesired NTSC co-channel picture and chroma beat components represented by signals 22 and 24 respectively. As described previously, the beat components occur at frequencies substantially corresponding to fs/12 and 5fs/12 and are produced as a result of beating the regenerated HDTV carrier with the NTSC picture carrier and the NTSC chroma subcarrier respectively.

The output of synchronous detector 120 is coupled to a clock circuit 122 which regenerates clock signal fs and to the input of a filter and decoder stage 140. Stage 140 comprises a linear filter having a response represented by curve 26 of FIG. 3. This response includes a null at frequencies corresponding to both fs/12 and 5fs/12 to cancel or substantially cancel both the interfering NTCS picture and chroma beats. As explained in copending applications Ser. No. 600,469 and Ser. No. 601,169, while a linear filter may be provided for producing nulls to reduce interfering NTSC co-channel signals in an HDTV receiver, it may also introduce intersymbol interference in the received HDTV digitally encoded data. This problem may be avoided by the use of precoder 34 in the HDTV transmitter to condition the compressed digital HDTV signal as fully explained in Ser. No. 601,169.

Figure 4A:
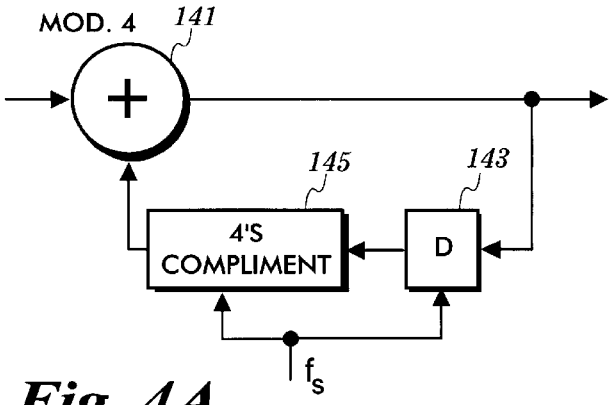
FIGS. 4A and 4B are block diagrams of complementary circuits which may be used in the transmitter and receiver respectively of FIG. 1 in accordance with the invention.
Figure 4B:
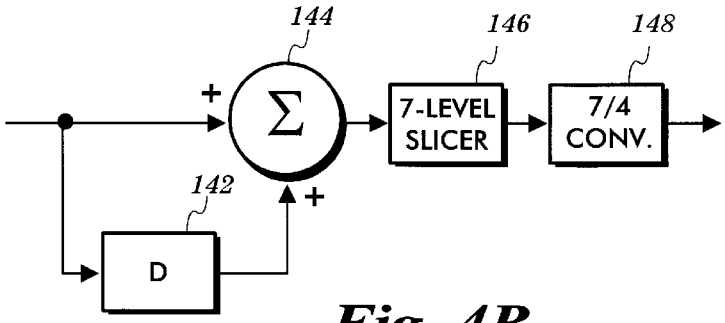
Figure 5A:
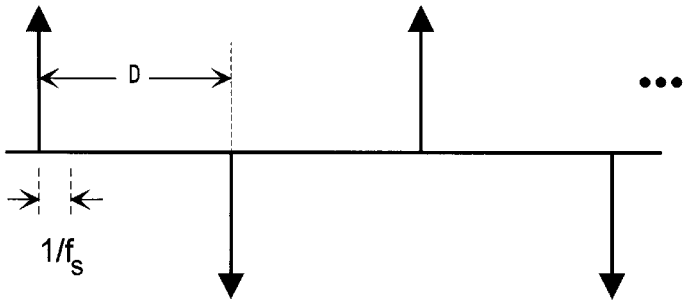
FIGS. 5A and 5B depict the impulse response characteristics of the circuits shown in FIGS. 4A and 4B respectively.
Figure 5B:
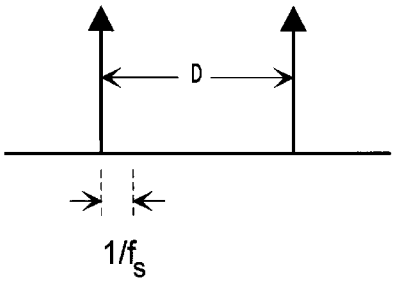

An exemplary precoder circuit and a complimentary linear filter, preferably comprising a comb filter, are illustrated in FIGS. 4A and 4B respectively. The comb filter comprises a feedforward circuit coupling the output of synchronous detector 120 to the input of a delay circuit 142 and to one input of a summer 144. The output of delay circuit 142 is coupled to a second input of summer 144. Summer 144 adds the delayed signal to the undelayed signal and, assuming the use of a four level digitally encoded signal, couples the result to a 7-level slicer 146. The output of slicer 146 is coupled to a 7-level to 4-level converter 148 which maps the seven level output of slicer 146 to a four level output corresponding to the digitally encoded signal produced at the output of compressor 32 of transmitter 10. The impulse response of the comb filter is illustrated in FIG. 5B. The complimentary precoder of FIG. 4A comprises a feedback circuit comprising a modulo-4 adder 141 receiving the output of compressor 32 at a first input. The output of adder 141 is fed back through a delay 143 and a 4's complement circuit 145 to a second input of adder 141. The feedback signal is therefore effectively subtracted from the input signal. The impulse response of the precoder is illustrated in FIG. 5A. As fully explained in previously mentioned copending application Ser. No. 601,169, the use of the precoder in transmitter 10 facilitates the use of 7-level slicer 146 and 7-level to 4-level converter 148 for eliminating the intersymbol interference introduced in the received HDTV digital data samples by the comb filter in receiver 100.

Figure 6:
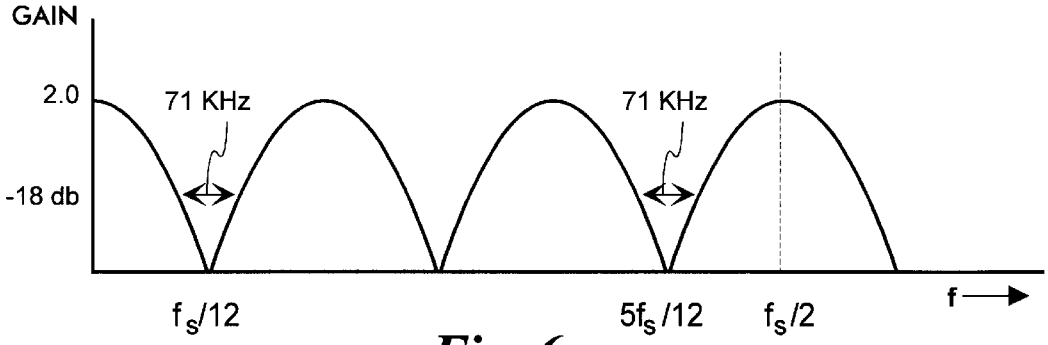
FIG. 6 is a graph illustrating the frequency domain response of the circuit shown in FIG. 4B.

In order to provide the desired complimentary operation of the precoder and comb filter illustrated in FIGS. 4A and 4B, the delays characterizing delay circuits 142 and 143 must be identical. Moreover, the delay characterizing the precoder must be an integral multiple of the data sampling rate fs, i.e. D=N (1/fs), since the precoder 141 performs a purely digital operation. As a consequence, the delay characterizing delay circuit 142 of the comb filter must also be D=N (1/fs). The frequency response of the comb filter of FIG. 4B with N set equal to 6 is illustrated in FIG. 6 and will be seen to include notches at both desired frequencies fs/12 and 5fs/12. At the −18 db point each notch has a width of about 75 KHz.

Figure 7A:
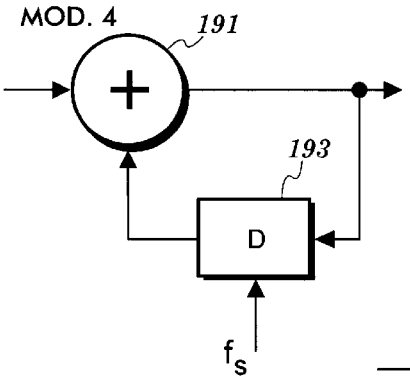
FIGS. 7A and 7B are block diagrams of additional complementary circuits which may be used in the transmitter and receiver respectively of FIG. 1 in accordance with the invention.
Figure 7B:
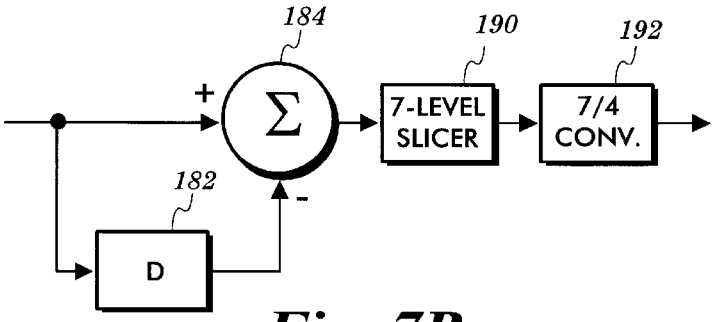
Figure 8A:
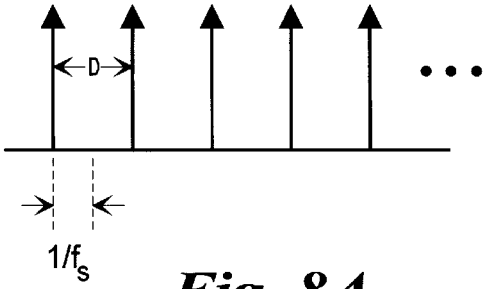
FIGS. 8A and 8B depict the impulse response characteristics of the circuits shown in FIGS. 7A and 7B respectively.
Figure 8B:
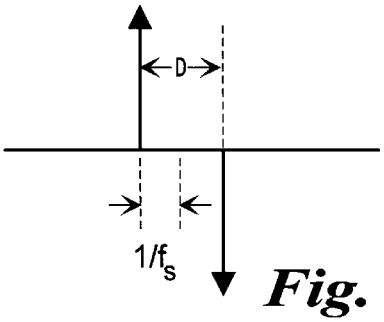
Figure 9:
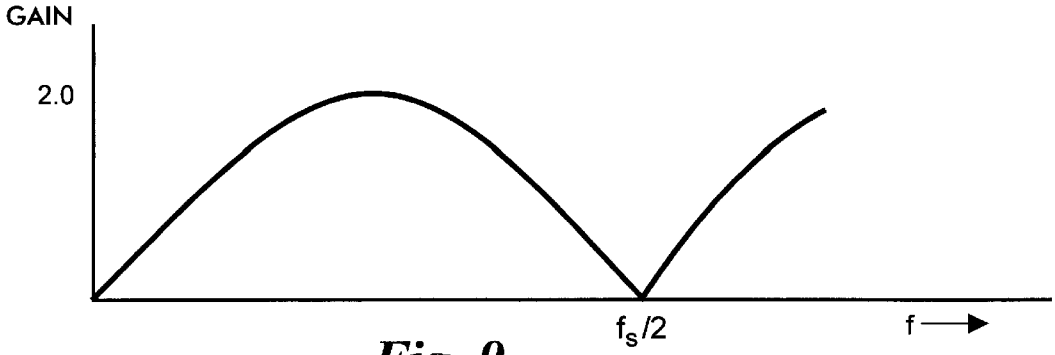
FIG. 9 is a graph illustrating the frequency domain response of the circuit shown in FIG. 8B.

An additional complementary precoder—filter pair may be provided for reducing the beat signal occurring near fs/2 caused by the NTSC co-channel audio carrier as illustrated in FIGS. 7A and 7B respectively. The impulse responses of these circuits are shown in FIGS. 8A and 8B respectively. The comb filter of FIG. 7B also comprises a feedforward circuit whose input is coupled to the input of a delay circuit 182 and to one input of a summer 184. The output of delay circuit 182 is coupled to the negative input of summer 184 so that the delayed signal is subtracted from the input signal. Delay circuit 182 is characterized by a delay corresponding to 2/fs. Summer 184 provides an output to a 7-level slicer 190, the output of which is then applied to a 7-level to 4-level converter 192 which maps the 7-level output of slicer 190 to a 4-level output. The frequency response of the comb filter of FIG. 7B is illustrated in FIG. 9 and will be seen to include a notch at fs/2 as desired for attenuating the NTSC co-channel audio beat.

The complementary precoder circuit of FIG. 7A comprises a feedback circuit comprising a modulo-4 adder 191 receiving the output of compressor 32 at a first input. The output of adder 191 is fed back through a delay circuit 193 characterized by a delay corresponding to 2/fs. The output of delay 193 is applied to the second input of adder 191 which therefore effectively adds the feedback signal to the input signal to produce the impulse response shown in FIG. 8A.

Figure 10A:
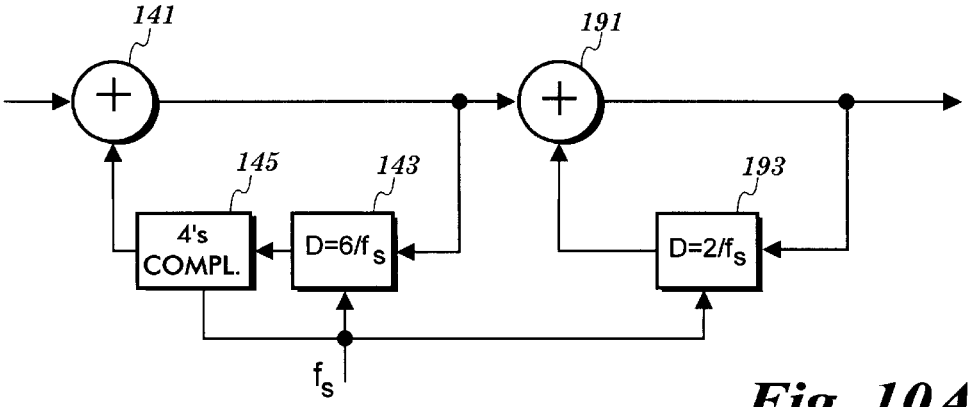
FIGS. 10A and 10B are block diagrams of composite circuits which combine the functions of the circuits of FIGS. 4A, 7A and FIGS. 4B, 7B respectively.
Figure 11A:
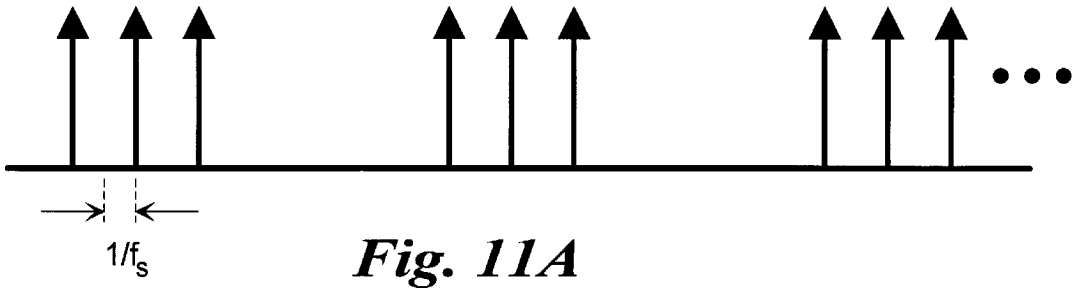
FIGS. 11A and 11B depict the impulse response characteristics of the circuits shown in FIGS. 10A and 10B respectively.
Figure 11B:
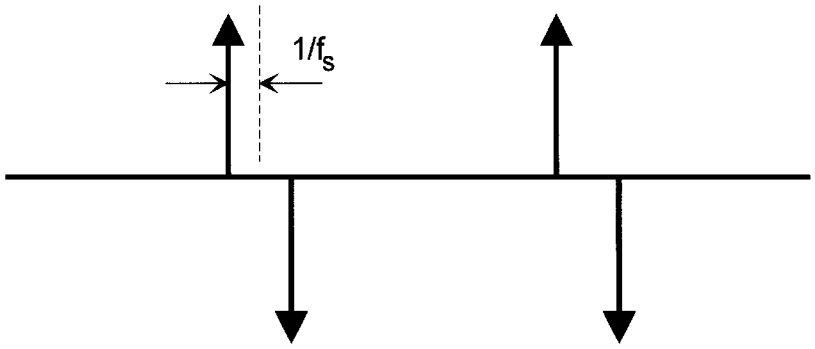
Figure 12:
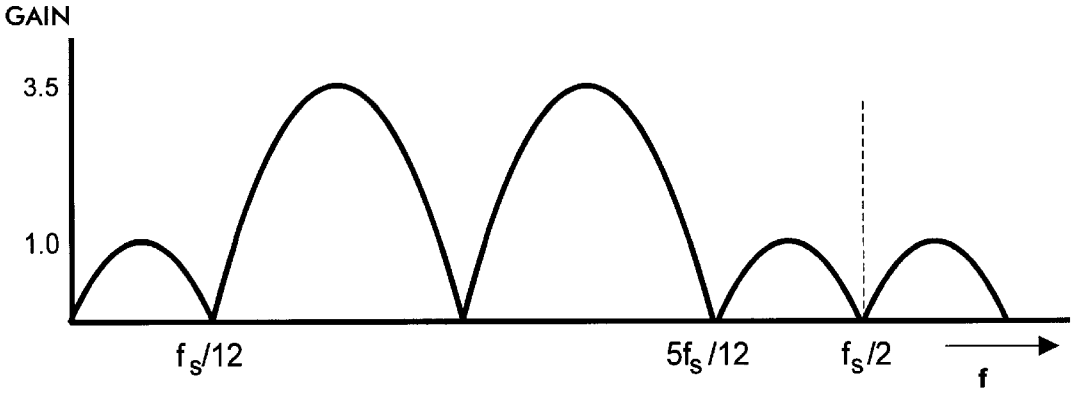
FIG. 12 is a graph illustrating the frequency domain response of the circuit shown in FIG. 11B.

The comb filters of FIGS. 4B and 7B may be connected in series to effect attenuation of the NTSC co-channel picture carrier and color subcarrier beats as well as the NTSC co-channel audio carrier beat. Alternatively, the impulse responses of the two comb filters may be convolved to derive a composite impulse response from which a composite filter may synthesized. This is illustrated in FIGS. 10–12. In particular, FIG. 10A illustrates a precoder comprising the precoders of FIGS. 4A and 7A connected in series, the impulse response of which is shown in FIG. 11A, While FIG. 10B illustrates a complementary comb filter circuit synthesized on the basis of the convolved impulse response shown in FIG. 11B.

Figure 10B:
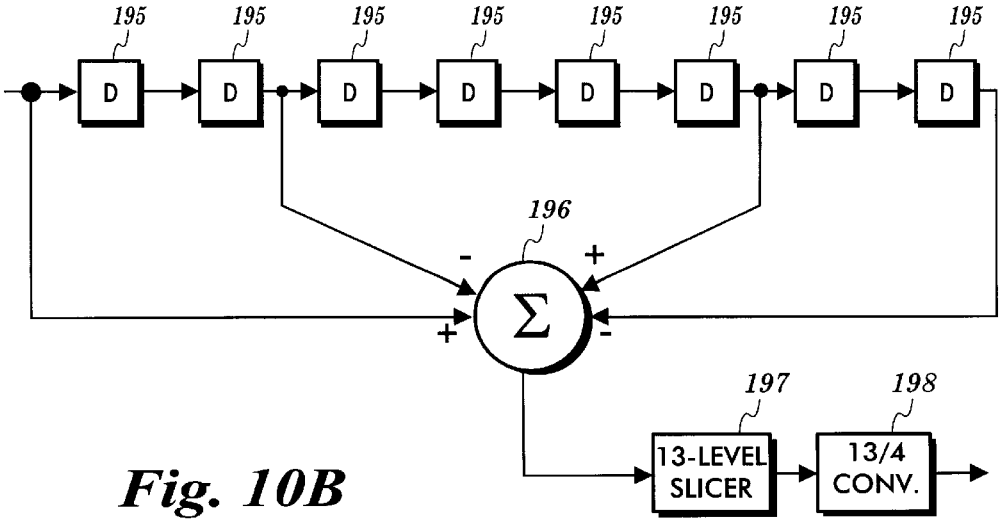

The comb filter of FIG. 10B comprises eight 1/fs delay elements 195 connected in series. The input signal from detector 120 is applied to the first delay element 195 and to a positive input of a summer 196. The outputs of the second and eighth delay elements 195 are applied to respective negative inputs of summer 196 and the output of the sixth delay element 195 is applied to a positive input of summer 196. The frequency response of the filter is illustrated in FIG. 12 and will be seen to comprise notches at all three beat frequencies, fs/12, 5fs/12 and fs/2, as desired. The output of summer 196 is coupled to a 13-level slicer 197 and therefrom to a 13/4 converter 198.

Figure 13A:
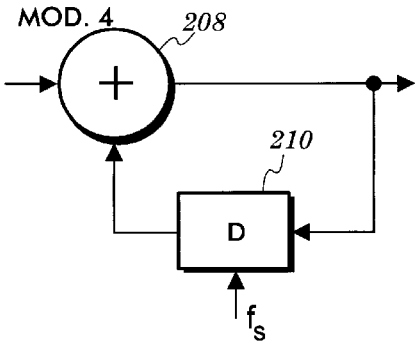
FIG. 13A and 13B are block diagrams of a further complimentary circuit pair which may be used in the transmitter and receiver respectively of FIG. 1 in accordance with the invention.
Figure 13B:
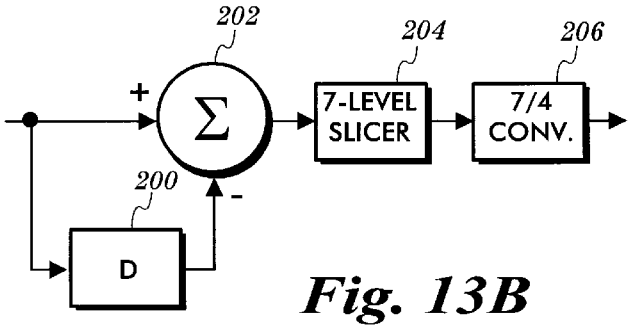
Figure 14A:
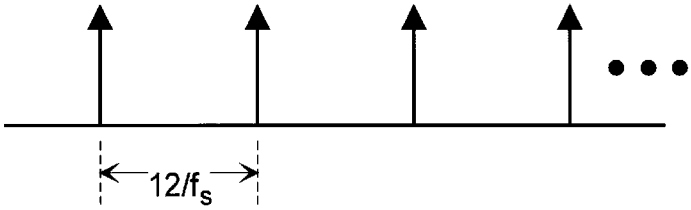
FIGS. 14A and 14B depicts the impulse response characteristics of the circuits shown in FIGS. 13A and 13B respectively.
Figure 14B:
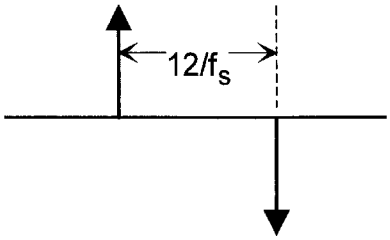
Figure 15:
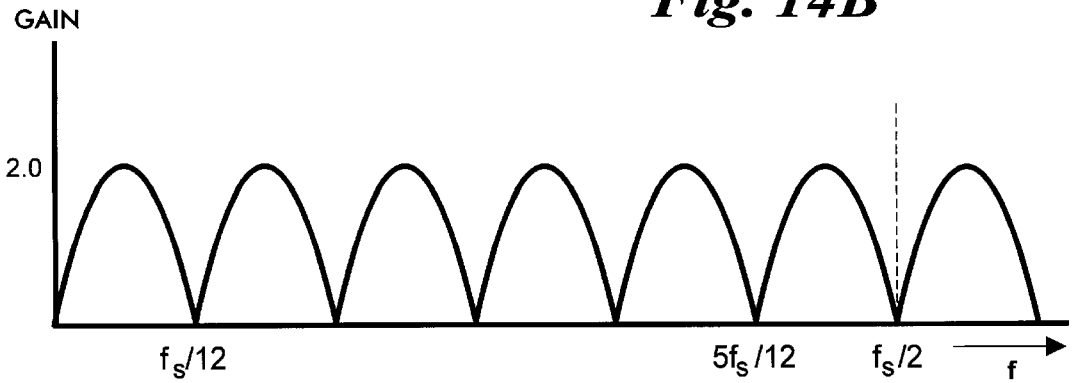
FIG. 15 is a graph illustrating the frequency domain response of the circuit shown in FIG. 13B.

Alternatively, the complimentary precoder-filter pair illustrated in FIGS. 13A and 13B respectively may be used to attenuate the NTSC picture carrier, color subcarrier and audio carrier beats occurring at frequencies corresponding to about fs/12, 5fs/12 and fs/2 respectively. The impulse responses of these circuits are shown in FIGS. 14A and 14B respectively. The filter of FIG. 13B comprises a feedforward circuit whose input is coupled to the input of a delay circuit 200 and to one input of a summer 202. The output of delay circuit 200 is coupled to the negative input of summer 202 so that the delayed signal is subtracted from the input signal. Delay circuit 200 is characterized by a delay corresponding to 12/fs. Summer 202 provides an output to a 7-level slicer 204, the output of which is applied to a 7-level to 4-level converter 206 which maps the 7-level output of slicer 204 to a 4 level output. The frequency response of the filter of FIG. 13B is illustrated in FIG. 15 and will be seen to include notches at fs/12, 5fs/12 and fs/2 for attenuating the NTSC co-channel beat signals.

The complimentary precoder of FIG. 13A comprises a feedback circuit comprising a modulo-4 adder 208 receiving the output of compressor 32 at a first input. The output of adder 208 is fed back through a delay circuit 210 characterized by a delay corresponding to 12/fs. The output of delay circuit 210 is applied to the second input of adder 208 which therefore effectively adds the feedback signal from delay circuit 210 to the input signal to produce the impulse response shown in FIG. 14A.

In the absence of co-channel interference from a NTSC transmitter, a complementary feed-forward decoder can be used in any of the embodiments of FIGS. 4B, 7B, 10B and 13B to decode the precoded signal as explained in copending application Ser. No. 601,169. This avoids the noise degradation introduced by the comb filters.

Finally, referring back to FIG. 1, the output of the comb filter and decoder 140 is coupled to an expansion circuit 150 for reconstructing a wideband video signal representing the original 37 MHz video source signal. The reconstructed signal is applied to a display 160 for displaying the reconstructed image.

Figure 16:
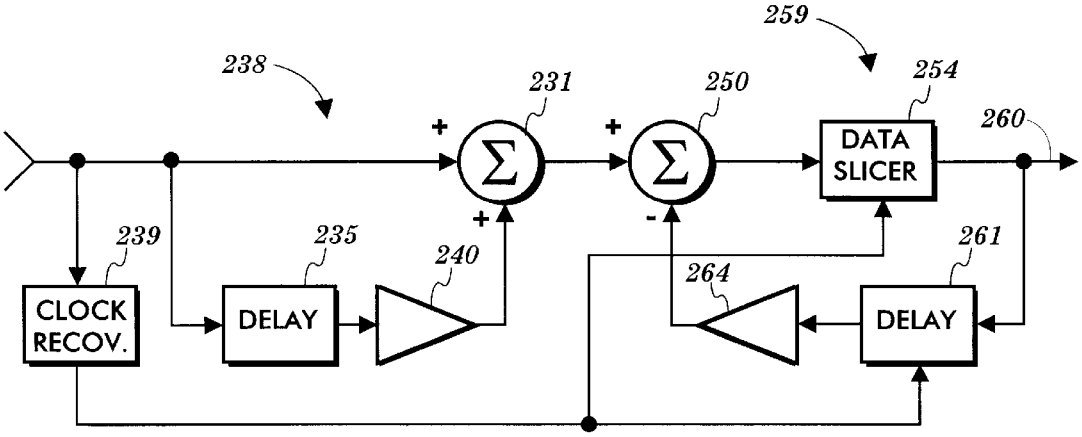
FIG. 16 is a block diagram of a co-channel interference filter which may be incorporated in the receiver of FIG. 1.

In the alternative, filter and decoder 140 may be implemented in the form disclosed in copending application Ser. No. 600,469 as illustrated in FIG. 16. In this case, the use of precoder 34 in transmitter 10 is not required. Referring to FIG. 16, the filter arrangement comprises a series combination of a comb filter 238 and an intersymbol interference filter 259. Comb filter 238 is operative to reduce co-channel interference at its input but also produces an undesired intersymbol interference signal. Intersymbol interference filter 259 is operative to remove this intersymbol interference signal.

More specifically, comb filter 238 includes a summer network 231 having a first positive input coupled for receiving the data from detector 120 and a second positive input for receiving the data through a delay network 235 and an amplifier 240. Delay 235 is preferably selected to produce a signal delay precisely equal to a selected NTSC periodicity characteristic and the gain of amplifier 240 is chosen to produce a feed forward gain of less than one. Intersymbol interference filter 259 includes a summer 250 having a positive input coupled to receive the output of summer 231, a negative input and an output. A data slicer 254 has an input coupled to the output of summer 250 and an output coupled to a data output terminal 260. The output of data slicer 254 is fed back to the negative input of summer 250 through a delay 261 (providing a delay equal to that of delay 235) and an amplifier 264. Data slicer 254 and delay 261 are operated in response to a clock recovery circuit 239 which produces a clock signal that is maintained at a multiple of the selected NTSC periodicity.

In operation, comb filter 238 is characterized by a frequency response selected for reducing selected NTSC co-channel interference signals. However, as mentioned previously, filter 238 also produces an undesired intersymbol interference signal. Filter 259 is effective for removing this intersymbol interference signal by producing a negative replica thereof which is used to cancel the former signal. As a result, the overall response of filters 238 and 259 is substantially free of both NTSC co-channel interference and intersymbol interference.

It will be apparent to those skilled in the art that while the system set forth herein utilizes a four level digitally encoded signal, the present invention may be utilized in other digital systems using other digital encoding formats.

What has thus been shown is a high definition television transmission system which substantially reduces NTSC co-channel interference without significantly degrading HDTV receiver performance. The system shown is capable of application to numerous types of digital processing formats for high definition television systems.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. A method of transmitting a television signal comprising:

providing an N-level digitally encoded signal at a sample rate fs substantially equal to three times the NTSC color subcarrier frequency;

generating a carrier signal, *wherein said carrier signal has a frequency less than the frequency of the picture carrier of an NTSC co-channel signal by an amount of about fs/12;* modulating said carrier signal with said N-level digitally encoded signal; and forming a transmission signal in response to said modulated carrier.

2. The method of claim 1 wherein said sample rate is equal to 684 times the NTSC horizontal scanning frequency.

[3. The method of claim 1 wherein said carrier signal has a frequency less than the frequency of the picture carrier of an NTSC co-channel signal by an amount of about fs/12.]

4. The method of claim [3] *1* wherein said transmission signal comprises a suppressed carrier, VSB signal including a Nyquist slope characterized by a center frequency substantially coincident with the frequency of said carrier signal.

5. The method of claim 4 wherein said transmission signal comprises a pilot signal [in quadrature relation with] *having a frequency equal to the frequency of* said carrier signal.

6. A method of transmitting a television signal over a television channel comprising:

providing an N-level digitally encoded signal at a sample rate fs substantially equal to three times the NTSC color subcarrier frequency;

generating a carrier signal having a frequency less than the frequency of the picture carrier of an NTSC co-channel signal by an amount of about fs/12; and modulating said carrier signal with said N-level digitally encoded signal for forming a transmission signal comprising a suppressed carrier, VSB signal having respective Nyquist slopes at the lower and upper edges of said channel, the center frequency of the Nyquist slope at the lower edge of said channel being substantially coincident with the frequency of said carrier signal.

7. The method of claim 6 wherein said sample rate is equal to 684 times the NTSC horizontal scanning frequency.

8. The method of claim 6 wherein said transmission signal comprises a pilot signal [in quadrature relation with] *having a frequency equal to the frequency of* said carrier signal.

9. A television signal receiver comprising:

means for receiving an N-level digitally encoded signal modulating a suppressed carrier signal, said N-level signal having a sample rate fs substantially equal to three times the NTSC color subcarrier frequency and said suppressed carrier signal having a frequency less than the frequency of the picture carrier of an NTSC co-channel signal by an amount of about fs/12;

means for demodulating said received N-level signal;

filter means processing said demodulated signal for providing an M-level output signal, where M is greater than N, said filter means having a frequency response including a notch at a frequency substantially equal to fs/12; and means for converting said M-level signal to an [N-level] *output* signal representing a televised image.

10. The receiver of claim 9 Wherein the frequency response of said filter means includes a notch at a frequency substantially equal to 5fs/12.

11. The receiver of claim 10 wherein the frequency response of said filter means includes an notch at a frequency substantially equal to fs/2.

12. The receiver of claim 11 wherein said filter means comprises means for delaying said demodulated signal by an interval substantially equal to 12/fs and means for subtracting the delayed signal from said demodulated signal for providing said M-level output signal.

13. The receiver of claim 9 wherein said received signal comprises a pilot signal having a [quadrature relationship with] *frequency equal to the frequency of* said suppressed carrier signal, said receiver including means responsive to said pilot signal for developing a regenerated carrier signal having frequency and phase characteristics corresponding to said suppressed carrier signal and means for applying said regenerated carrier signal to said demodulating means.

14. The receiver of claim 13 wherein said carrier signal regenerating means comprises a frequency and phase locked loop responsive to said pilot signal for generating an intermediate signal having frequency and phase characteristics corresponding thereto [and means for shifting the phase of said Intermediate signal by 90°] for providing said regenerated carrier signal.

15. A television signal receiver comprising:

means for receiving an N-level digitally encoded signal modulating a suppressed carrier signal, said N-level signal having a sample rate fs substantially equal to three time the NTSC color subcarrier frequency and said suppressed carrier signal having a frequency less than the frequency of the picture carrier of an NTSC co-channel signal by an amount of about fs/12;

means for demodulating said received N-level signal;

filter means comprising means for delaying said demodulated signal by an interval substantially equal to 12/fs and means for subtracting the delayed signal from said demodulated signal for providing an M-level output signal, where M is greater than N; and means for converting said M-level signal to an [N-level] *output* signal representing a televised image.

16. A receiver for receiving a television signal transmitted over a selected channel comprising:

means for receiving a transmission signal comprising a suppressed carrier, VSB signal having respective Nyquist slopes at the lower and upper edges of said selected channel, the center frequency of the Nyquist slope at the lower edge of said selected channel being substantially coincident with the frequency of said suppressed carrier, said suppressed carrier being modulated by an N-level digitally encoded signal having a sample rate fs substantially equal to three times the NTSC color subcarrier frequency and said suppressed carrier having a frequency less than the frequency of the picture carrier of an NTSC co-channel signal by an amount of about fs/12;

means coupled to said receiving means for demodulating said N-level signal; and filter means processing said demodulated signal for providing an [N]*M*-level output signal, *where M is greater than N,* said filter means having a frequency response including notches at frequencies substantially equal to fs/12 and 5fs/12.

17. The receiver of claim 16 wherein said filter means comprises a linear filter [having a frequency response including notches at frequencies substantially equal to fs/12 and 5fs/12 processing said demodulated signal for providing an M-level output signal, where M is greater than N,] and *including* means for converting said M-level output signal to [said N level output] *a* signal *representing a televised image.*

18. The receiver of claim 17 wherein the frequency response of said filter means includes a notch at a frequency substantially equal to fs/2.

19. A receiver for receiving a television signal transmitted over a selected channel comprising:

means for receiving a transmission signal comprising a suppressed carrier, VSB signal having respective Nyquist slopes at the lower and upper edges of said selected channel, the center frequency of the Nyquist slope at the lower edge of said selected channel being substantially coincident with the frequency of said suppressed carrier, and a pilot signal, said suppressed carrier being modulated by an N-level digitally encoded signal having a sample rate fs substantially equal to three times the NTSC color subcarrier frequency and said suppressed carrier having a frequency less than the frequency of the picture carrier of an NTSC co-channel signal by an amount equal to about fs/12;

means responsive to said pilot signal for developing a regenerated carrier signal having frequency and phase characteristics corresponding to said suppressed carrier signal;

means coupled to said receiving means and responsive to said regenerated carrier signal for demodulating said N-level signal; and filter means processing said demodulated signal for providing an [N] *M* level output signal, *where M is greater than N,* said filter means having a frequency response including notches at frequencies substantially equal to fs/12 and 5fs/12.

20. The receiver of claim 19 wherein said filter means comprises a linear filter [having a frequency response including notches at frequencies substantially equal to fs/12 and 5fs/12 processing said demodulated signal for providing an M-level output signal, where M is greater than N] and *including* means for converting said M-level output signal to [said N level output] *a* signal *representing a televised image.*

21. The receiver of claim 20 wherein said linear filter comprises means for delaying said demodulated signal by an interval substantially equal to 12/fs and means for substracting the delayed signal from said demodulated signal for providing said M-level output signal.

22. The receiver of claim 19 wherein said carrier signal regenerating means comprises a frequency and phase locked loop responsive to said pilot signal for generating an intermediate signal having frequency and phase characteristics corresponding thereto [and means for shifting the phase of said intermediate signal by 90°] for providing said regenerated carrier signal.

23. A method of transmitting and receiving a television signal over a selected channel comprising:

providing a transmission signal comprising a suppressed carrier, VSB signal having respective Nyquist slopes at the upper and lower edges of said selected channel, the center frequency of the Nyquist slope at the lower edge of said selected channel being substantially coincident with the frequency of said suppressed carrier, said suppressed carrier being modulated by an N-level digitally encoded signal having a sample rate fs substantially equal to three times the NTSC color subcarrier frequency and said suppressed carrier having a frequency less than the frequency of the picture carrier of an NTSC co-channel signal by an amount equal to about fs/12;

transmitting said transmission signal over said selected channel;

receiving said transmitted signal;

demodulating said received signal for recovering said N-level signal;

subjecting said recovered N-level signal to a filter response having notches at frequencies substantially equal to fs/12 and 5fs/12 for providing a filtered M-level signal, where M is greater than N; and converting said M-level signal to an [N-level] output signal representing said television signal.

24. The method of claim 23 including precoding an N-level data signal for providing said N-level digitally encoded signal.

25. The method of claim 24 wherein said subjecting step comprises delaying said recovered N-level signal by an interval substantially equal to 12/fs and subtracting said delayed recovered signal from said recovered signal for providing said M-level signal.

26. The method of claim 23 wherein said sample rate is equal to 684 times the NTSC horizontal scanning rate.

27. The method of claim 23 wherein said filter response includes a notch at a frequency substantially equal to fs/2.

28. A method of transmitting and receiving a television signal over a selected channel comprising:

providing a transmission signal comprising a suppressed carrier, VSB signal having respective Nyquist slopes at the upper and lower edges of said selected channel, the center frequency of the Nyquist slope at the lower edge of said selected channel being substantially coincident with the frequency of said suppressed carrier, and a pilot signal, said suppressed carrier being modulated by an N-level digitally encoded signal having a sample rate fs substantially equal to three times the NTSC color subcarrier frequency and said suppressed carrier having a frequency less than the frequency of the picture carrier of an NTSC co-channel signal by an amount equal to about fs/12;

transmitting said transmission signal over said selected channel;

receiving said transmitted signal;

regenerating a carrier signal in response to said received pilot signal, said regenerated carrier signal having frequency and phase characteristics corresponding to said suppressed carrier;

demodulating said received signal in response to said regenerated carrier signal for recovering said N-level signal;

subjecting said recovered N-level signal to a filter response having notches at frequencies substantially equal to fs/12 and 5fs/12 for providing a filtered M-level signal, where M is greater than N; and converting said M-level signal to an [N-level] output signal representing said television signal.

29. The method of claim 28 including precoding an N-level data signal for providing said N-level digitally encoded signal.

30. The method of claim 28 wherein said sample rate is equal to 684 times the NTSC horizontal scanning rate.

31. The method of claim 28 wherein said filter response includes a notch at a frequency substantially equal to fs/2.

32. A method of providing a television transmission signal for transmission over a selected television channel providing:

providing an N-level digitally encoded signal at a sample rate fs; and modulating a carrier signal with said N-level digitally encoded signal for forming a transmission signal comprising a suppressed carrier, VSB signal having respective Nyquist slopes at the lower and upper edges of said selected television channel, the frequency of said carrier signal being substantially coincident with the center frequency of the Nyquist slope at the lower edge of said selected television channel and the frequency fs/2 being substantially coincident with the center frequency of the Nyquist slope at the upper edge of said selected television channel.

33. The method of claim 32 wherein said selected television channel has a bandwidth of about 6 MHz and wherein said sample rate fs is substantially equal to three times the NTSC color subcarrier frequency.

34. A receiver for receiving a television signal transmitted over a selected channel comprising:

means for receiving a television signal comprising a suppressed carrier, VSB signal having respective Nyquist slopes at the lower and upper edges of said selected channel, said suppressed carrier being modulated by an N-level digitally encoded signal having a sample rate fs, the frequency of said suppressed carrier being substantially coincident with the center frequency of the Nyquist slope at the lower edge of said selected channel and the frequency fs/2 being substantially coincident with the center frequency of the Nyquist slope at the upper edge of said selected channel; and demodulation means coupled to said receiving means and responsive to said received television signal for recovering said N-level digitally encoded signal.

35. The receiver of claim 34 wherein said television channel has a bandwidth of about 6 MHz and wherein said sample rate fs is substantially equal to three time the NTSC color subcarrier frequency.

36. The receiver of claim 34 including filter means coupled to said demodulation means, said filter means having a frequency response for attenuating selected co-channel interference signals.

37. The receiver of claim 35 including filter means coupled to said demodulation means, said filter means having a frequency response for attenuating co-channel interference signals occurring at a frequency substantially equal to fs/12.

38. The method of claim 6 including:

transmitting said transmission signal over said television channel;

receiving said transmitted signal; and demodulating said received signal for recovering said N-level digitally encoded signal.

*39. A receiver for receiving an N-level digitally encoded signal transmitted over a selected channel comprising:*

*means for receiving an N-level digitally encoded signal at a sampling rate fs substantially equal to three times the NTSC color subcarrier frequency, wherein the N-level digitally encoded signal is a modulated suppressed carrier signal having a frequency less than the frequency of the picture carrier of an NTSC co-channel signal by an amount of about fs/12; and*

*means for demodulating said received N-level digitally encoded signal.*

*40. The receiver of claim 39 wherein said means for receiving comprises means for receiving a N-level digitally encoded signal at a sampling rate fs of about 684 times the NTSC horizontal scanning frequency.*

*41. The receiver of claim 39 wherein said received signal comprises a pilot signal at the frequency of said suppressed carrier signal, said receiver further comprising means responsive to said pilot signal for developing a regenerated carrier signal having frequency and phase characteristics corresponding to said suppressed carrier signal, said means for demodulating being responsive to said regenerated carrier for recovering said N-level digitally encoded signal.*

*42. The receiver of claim 39 including filter means for processing said demodulated signal, said filter means having a frequency response for attenuating selected co-channel interference signals.*

*43. The receiver of claim 42 wherein the frequency response of said filter means includes a notch at a frequency of about fs/12.*

*44. The receiver of claim 42 wherein said filter means comprises means for providing an M-level output signal, where M is greater than N.*

*45. The receiver of claim 42 wherein the frequency response of said filter means includes a notch at a frequency of about 5 fs/12.*

*46. The receiver of claim 42 wherein the frequency response of said filter means includes a notch at a frequency of about fs/2.*

*47. The receiver of claim 39 wherein said N-level digitally encoded signal comprises a television signal.*

*48. A receiver for receiving an N-level digitally encoded signal transmitted over a selected channel comprising:*

*means for receiving a signal comprising a suppressed carrier, VSB signal having respective Nyquist slopes at the lower and upper edges of said selected channel, said suppressed carrier being modulated by an N-level digitally encoded signal having a sampling rate fs, the frequency of said suppressed carrier being substantially coincident with the center frequency of the Nyquist slope at the lower edge of said selected channel and the frequency fs/2 being substantially coincident with the center frequency of the Nyquist slope at the upper edge of said selected channel; and*

*demodulation means coupled to said receiving means for recovering said N-level digitally encoded signal.*

*49. The receiver of claim 48 wherein said sampling rate fs is substantially equal to three times the NTSC color subcarrier frequency.*

*50. The receiver of claim 49 wherein said sampling rate fs is equal to about 684 times the NTSC horizontal scanning frequency.*

*51. The receiver of claim 48 wherein said suppressed carrier signal has a frequency less than the frequency of the picture carrier of an NTSC co-channel signal by an amount of about fs/12.*

*52. The receiver of claim 51 wherein said received signal comprises a pilot signal at the frequency of said suppressed carrier signal, said receiver further comprising means responsive to said pilot signal for developing a regenerated carrier signal having frequency and phase characteristics*

*corresponding to said suppressed carrier signal, said demodulation means being responsive to said regenerated carrier for recovering said N-level digitally encoded signal.*

*53. The receiver of claim 48 including filter means for processing said recovered signal, said filter means having a frequency response for attenuating selected co-channel interference signals.*

*54. The receiver of claim 53 wherein the frequency response of said filter means includes at notch at a frequency of about fs/12.*

*55. The receiver of claim 53 wherein said filter means comprises means for providing an M-level output signal, where M is greater than N.*

*56. The receiver of claim 53 wherein the frequency response of said filter means includes a notch at a frequency of about 5 fs/12.*

*57. The receiver of claim 53 wherein the frequency response of said filter means includes a notch at a frequency of about fs/2.*

*58. A method of transmitting an N-level digitally encoded signal comprising:*

*providing an N-level digitally encoded signal at a sampling rate fs substantially equal to three times the NTSC color subcarrier frequency;*

*generating a carrier signal; and*

*transmitting said N-level digitally encoded signal as modulation of said carrier signal, wherein said carrier signal is a suppressed carrier signal having a frequency less than the frequency of the picture carrier of an NTSC co-channel signal by an amount of about fs/12.*

*59. The method of claim 58 wherein said sampling rate is equal to about 684 times the NTSC horizontal scanning frequency.*

*60. The method of claim 58 wherein said transmitting step comprises transmitting a VSB signal including a Nyquist slope characterized by a center frequency substantially coincident with the frequency of said suppressed carrier signal.*

*61. The method of claim 38 including transmitting a pilot signal at the frequency of said suppressed carrier.*

*62. A method of providing an N-level digitally encoded signal for transmission over a selected channel comprising:*

*providing an N-level digitally encoded signal at a sampling rate fs; and*

*modulating a carrier signal with said N-level digitally encoded signal for forming a transmission signal comprising a suppressed carrier, VSB signal having respective Nyquist slopes at the lower and upper edges of said selected channel, the frequency of said suppressed carrier being substantially coincident with the center frequency of the Nyquist slope at the lower edge of said selected channel and the frequency fs/2 being substantially coincident with the center frequency of the Nyquist slope at the upper edge of said selected channel.*

*63. The method of claim 62 wherein said sampling rate fs is substantially equal to three times the NTSC color subcarrier frequency.*

*64. The method of claim 63 wherein said sampling rate fs is equal to about 684 times the NTSC horizontal scanning frequency.*

*65. The method of claim 62 wherein said suppressed carrier signal has a frequency less than the frequency of the picture carrier of an NTSC co-channel signal by an amount of about fs/12.*

*66. The method of claim 62 including transmitting a pilot signal at the frequency of said suppressed carrier signal.*

*67. A method of receiving an N-level digitally encoded signal transmitted over a selected channel comprising the following steps:*

*receiving an N-level digitally encoded signal at a sampling rate fs substantially equal to three times the NTSC color subcarrier frequency, wherein the N-level digitally encoded signal is a modulated suppressed carrier signal having a frequency which is approximately 309.5 kHz above an edge of the transmitted selected channel; and*

*demodulating said received N-level digitally encoded signal.*

*68. The method of claim 1 wherein said carrier signal has a frequency, and wherein the frequency of said carrier signal is approximately 309.5 kHz above a transmission channel edge.*

*69. The method of claim 6 wherein the frequency of said suppressed carrier, VSB signal is approximately 309.5 kHz above said lower edge said transmitted channel.*

*70. The receiver of claim 9 wherein the frequency of said suppressed carrier signal is approximately 309.5 kHz above a transmission channel edge.*

*71. The receiver of claim 15 wherein the frequency of said suppressed carrier signal is approximately 309.5 kHz above a transmission channel edge.*

*72. The receiver of claim 16 wherein the frequency of said suppressed carrier, VSB signal is approximately 309.5 kHz above said lower edge of said transmitted selected channel.*

*73. The receiver of claim 19 wherein the frequency of said suppressed carrier, VSB signal is approximately 309.5 kHz above said lower edge of said transmitted selected channel.*

*74. The method of claim 23 wherein the frequency of said suppressed carrier, VSB signal is approximately 309.5 kHz above said lower edge of said transmitted selected channel.*

*75. The method of claim 28 wherein the frequency of said suppressed carrier, VSB signal is approximately 309.5 kHz above said lower edge of said transmitted selected channel.*

*76. The method of claim 32 wherein the frequency of said suppressed carrier, VSB signal is approximately 309.5 kHz above said lower edge of said selected transmission television channel.*

*77. The method of claim 32 wherein said transmission signal comprises a pilot signal having a frequency substantially equal to the frequency of said suppressed carrier, VSB signal.*

*78. The receiver of claim 34 wherein the frequency of said suppressed carrier, VSB signal is approximately 309.5 kHz above said lower edge of said transmitted selected channel.*

*79. The receiver of claim 34 wherein said received television signal comprises a pilot signal having a frequency substantially equal to the frequency of said suppressed carrier, VSB signal, wherein said receiver further comprises means responsive to said pilot signal for developing a regenerated carrier signal having frequency and phase characteristics corresponding to said suppressed carrier, VSB signal, and wherein said demodulation means is responsive to said regenerated carrier for recovering said N-level digitally encoded signal.*

*80. The receiver of claim 39 wherein the frequency of said suppressed carrier signal is approximately 309.5 kHz above a transmission channel edge.*

*81. The receiver of claim 48 wherein the frequency of said suppressed carrier, VSB signal is approximately 309.5 kHz above said lower edge of said transmitted selected channel.*

*82. The method of claim 58 wherein the frequency of said suppressed carrier signal is approximately 309.5 kHz above a transmission channel edge.*

*83. The method of claim 62 wherein the frequency of said suppressed carrier, VSB signal is approximately 309.5 kHz above said lower edge of said selected transmission channel.*

*84. The method of claim 67 wherein said receiving step comprises the step of receiving a N-level digitally encoded signal at a sampling rate fs of about 684 times the NTSC horizontal scanning frequency.*

*85. The method of claim 67 wherein said receiving step comprises the steps of receiving a pilot signal having a frequency substantially equal to the frequency of said suppressed carrier signal and, in response to said pilot signal, developing a regenerated carrier signal having frequency and phase characteristics corresponding to said suppressed carrier signal, and wherein said demodulating step is performed in response to said regenerated carrier in order to recover said N-level digitally encoded signal.*

*86. The method of claim 67 including the further step of filtering said demodulated signal so as to attenuate co-channel interference.*

*87. The method of claim 86 wherein the filtering step comprises the step of filtering said demodulated signal with a frequency response having a notch at a frequency of about fs/12.*

*88. The method of claim 86 wherein the filtering step comprises the steps of filtering said demodulated signal so as to provide an M-level output signal, where M is greater than N.*

*89. The method of claim 86 wherein the filtering step comprises the step of filtering said demodulated signal with a frequency response having a notch at a frequency of about 5fs/12.*

*90. The method of claim 86 wherein the filtering step comprises the step of filtering said demodulated signal with a frequency response having a notch at a frequency of about fs/2.*

*91. The method of claim 67 wherein said N-level digitally encoded signal comprises a television signal.*

* * * * *